United States Patent [19]
Bilbro et al.

[11] Patent Number: 5,974,215
[45] Date of Patent: Oct. 26, 1999

[54] COMPOUND IMAGE SENSOR ARRAY HAVING STAGGERED ARRAY OF TAPERED OPTICAL FIBER BUNDLES

[75] Inventors: Griff Luhrs Bilbro; Wesley Edwin Snyder, both of Raleigh, N.C.; Anthony Zilic, King George, Va.

[73] Assignee: North Carolina State University, Raleigh, N.C.

[21] Appl. No.: 09/082,394

[22] Filed: May 20, 1998

[51] Int. Cl.[6] ........................................... G02B 6/06

[52] U.S. Cl. .................. 385/116; 385/115; 385/120; 362/556

[58] Field of Search .................................. 385/116, 115, 385/120, 121, 100, 106, 112; 362/554, 556, 560

[56] References Cited

U.S. PATENT DOCUMENTS

| | | | |
|---|---|---|---|
| 5,333,228 | 7/1994 | Kingstone | 385/100 |
| 5,337,325 | 8/1994 | Hwang | 385/115 X |
| 5,862,285 | 1/1999 | Danielian et al. | 385/121 |

*Primary Examiner*—Phan T. H. Palmer
*Attorney, Agent, or Firm*—Myers Bigel Sibley & Sajovec, P.A.

[57] ABSTRACT

An array of tapered optical fiber bundles having input faces for receiving incident radiation thereon are staggered with respect to one another such that an input face edge portion of a tapered optical fiber bundle overlies a portion of an input face of an adjacent optical fiber bundle so as to occlude the overlaid portion from incident radiation. Optical fiber bundles may be staggered in various configurations, including repeating patterns.

37 Claims, 10 Drawing Sheets

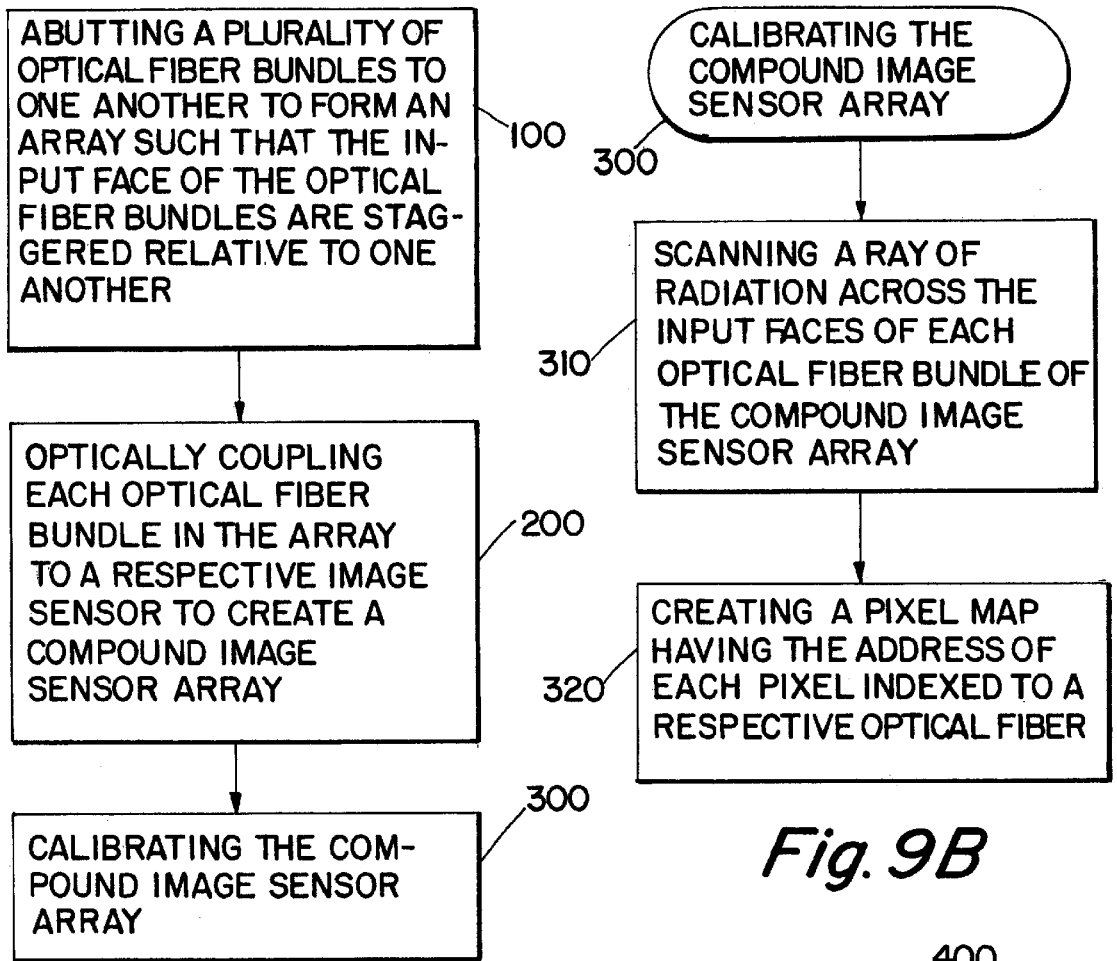
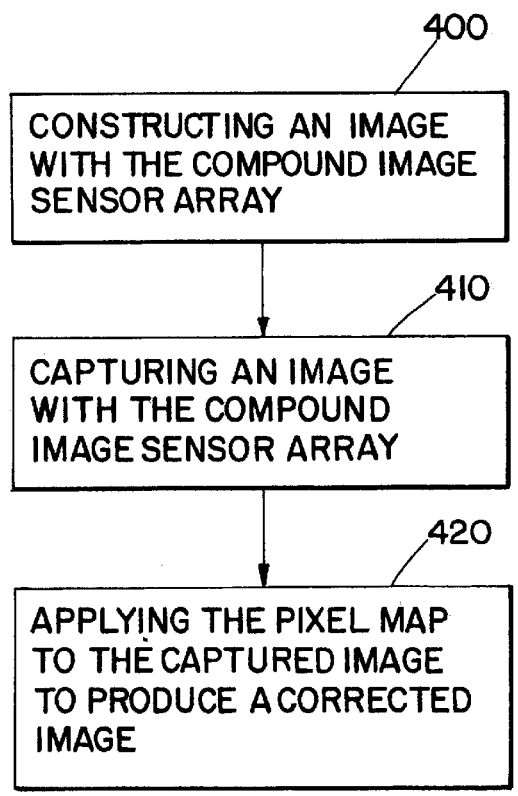
Fig. 9A
Fig. 9B
Fig. 9C

| 1 | 2 | 3 | 4 | 5 | 6 | 7 | 8 |
|---|---|---|---|---|---|---|---|
| 2 | 1 | 4 | 3 | 5 | 6 | 8 | 7 |
| 9 | 10 | 11 | 12 | 13 | 14 | 15 | 16 |
| 9 | 11 | 10 | 12 | 13 | 14 | 15 | 16 |

⋮

| 113 | 114 | 115 | 116 | 117 | 118 | 119 | 120 |
|---|---|---|---|---|---|---|---|
| 110 | 111 | 115 | 116 | 117 | 119 | 120 | 118 |

↑ 95 PIXEL MAP

Fig. 10C

| 1 | 2 | 3 | 4 | 5 | 6 | 7 | 8 |
|---|---|---|---|---|---|---|---|
| 0 | 150 | 2500 | 2400 | 2000 | 150 | 0 | 0 |
| 9 | 10 | 11 | 12 | 13 | 14 | 15 | 16 |
| 150 | 150 | 2600 | 2700 | 7000 | 80 | 90 | 0 |

⋮

| 113 | 114 | 115 | 116 | 117 | 118 | 119 | 120 |
|---|---|---|---|---|---|---|---|
| 30,000 | 20,000 | 15,000 | 150 | 0 | 0 | 10 | 15,500 |

↑ 97 STORED IMAGE

Fig. 10D

COMPOUND IMAGE SENSOR ARRAY HAVING STAGGERED ARRAY OF TAPERED OPTICAL FIBER BUNDLES

FIELD OF THE INVENTION

The present invention relates generally to image detection and, more particularly, to image detection using compound sensor arrays.

BACKGROUND OF THE INVENTION

Tapered optical fiber bundles can provide a low distortion method of magnifying or reducing an image. Used with a charge coupled device (CCD) sensor, tapered optical fiber bundles may be employed in medical radiography, fluoroscopy, and dental radiography, for enhancing images and reducing x-ray exposure times. Exemplary tapered optical fiber bundles are described in an article entitled "Fiberoptic Tapers Offer High-Quality Image Transmission" by Richard J. Weiss (http://192.149.147.16/web/oer/february/feb97/research.html), which is incorporated herein by reference in its entirety.

Multiple CCDs may be arranged in an array to form a compound image sensor. Compound image sensor arrays may be utilized to capture images that are larger than a single CCD device can capture. Arrays of tapered optical fiber bundles may be utilized with compound image sensor arrays wherein each optical fiber bundle in the array is coupled with a respective CCD sensor. Tapered optical bundles may be required to compensate for gaps between adjacent CCD sensors and for electronics surrounding individual CCD sensors.

To provide coverage of a focal plane that is as nearly seamless as possible, precise alignment of adjacent optical fiber bundles in an array may be required. Abutting edges of adjacent optical fiber bundles may need to be mated within a tolerance of hundreds of microns in a single plane in order to produce substantially seamless images. Accordingly, the focal plane edges of optical fiber bundles may need to be carefully analyzed so that adjacent bundles can be mated as seamlessly as possible. As a result, conventional assembly techniques for precisely aligning adjacent optical fiber bundles within an array may be expensive and labor-intensive.

In addition, because of conventional manufacturing techniques, the edges of optical fiber bundles may be irregular and of poor quality. Consequently, precise, abutting alignment between adjacent bundles may not be possible. As a result, gaps may be present between adjacent optical fiber bundles in an array. These gaps may result in images having seams or other imperfections. In addition, because optical fiber bundles are conventionally molded or milled, the outermost optical fibers at the input face of a bundle may be damaged, and thereby rendered optically inactive. Accordingly, portions of an image falling on optically inactive fibers within a bundle may not be captured by an image sensor coupled to the bundle. As a result, seams or other imperfections within the image may be produced.

SUMMARY OF THE INVENTION

It is therefore an object of the present invention to allow reduction in the time and cost of assembling tapered optical fiber bundles used in imaging sensor arrays.

It is also an object of the present invention to provide optical fiber bundle arrays that can produce substantially seamless images even though some of the optical fibers within the array may be optically inactive or there are gaps between adjacent optical fiber bundles.

These and other objects of the present invention are provided by an array of tapered optical fiber bundles having input faces for receiving incident radiation thereon staggered with respect to one another such that an input face edge portion of a tapered optical fiber bundle overlies a portion of an input face of an adjacent optical fiber bundle so as to occlude the overlaid portion from incident radiation. Tapered optical fiber bundle arrays according to the present invention may have optical fiber bundles staggered in various configurations, including repeating patterns. In addition, input faces of tapered optical fiber bundles along a medial portion of an array may be positioned closer to a radiation source than input faces of other respective optical fiber bundles.

A compound image sensor array incorporating the present invention can produce a substantially seamless image even though edge portions of adjacent tapered optical fiber bundles are not precisely mated together or even though optically inactive areas exist along the input face of a bundle. Furthermore, the present invention may be utilized with adjacent optical fiber bundles having irregular shaped edge portions.

Each tapered optical fiber bundle includes an output face and an opposite input face and directs radiation emitted from a source to an array of image sensors along a longitudinal direction. Each input face is substantially normal to the longitudinal direction and is configured to receive incident radiation from a source thereon. Optical fibers within each bundle may be tapered such that a diameter of an optical fiber is less at the output face than at the input face of a bundle.

According to another aspect of the present invention, steps for producing a compound image sensor array include abutting a plurality of optical fiber bundles to one another to form an array, such that input faces of the optical fiber bundles are staggered relative to one another and such that an input face edge portion of an optical fiber bundle overlies a portion of an input face of an adjacent optical fiber bundle so as to occlude the overlaid portion from incident radiation. Each optical fiber bundle in the array is optically coupled to a respective image sensor. A data processor is electrically connected to each image sensor for processing signal output from each of the image sensors. An assembled compound image sensor array may then be calibrated by scanning a ray of radiation across the input faces of each optical fiber bundle of the compound image sensor array; and creating a pixel map comprising an address of each pixel indexed to a respective optical fiber. The pixel map can be used to compensate for errors in an image caused by misaligned or damaged optical fibers within an optical fiber bundle.

The arrangement of adjacent tapered optical fiber bundles in a staggered, overlapping configuration according to the present invention, may simplify the process for assembling arrays of optical fiber bundles. Precise abutting alignment of adjacent bundles may not be required to produce a seamless image. Furthermore, damaged optical fibers along the edge portions of a bundle can be occluded from receiving radiation thereon by an adjacent optical fiber bundle. As a result, higher resolution and/or lower cost compound image sensors may be possible via the present invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A–9B schematically illustrate operations for a producing a compound sensor array according to the present invention.

FIG. 9C schematically illustrates operations for constructing an image with a compound image sensor array.

FIGS. 10A–10D illustrate operations for creating a pixel map.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
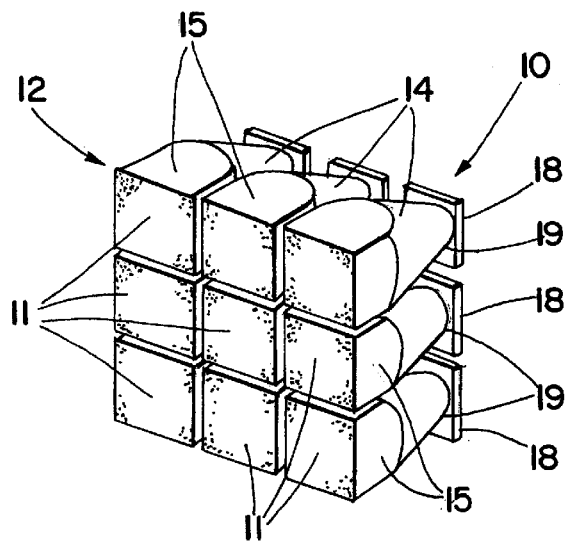
FIG. 1 illustrates a conventional compound image sensor array including a plurality of tapered optical fiber bundles in an array.

Referring now to FIG. 1, a conventional compound image sensor array 10 is illustrated. The illustrated compound image sensor array 10 includes an array 12 of tapered optical fiber bundles 14 wherein each optical fiber bundle is optically coupled with a respective CCD image sensor 18. As is known to those skilled in the art, each tapered optical fiber bundle 14 is formed from a plurality of optical fibers packed closely together and drawn into a tapered shape. In the illustrated embodiment, the input face 11 of each tapered optical fiber bundle 14 has a generally planar configuration. When arranged in an array 12, the input faces 11 of each tapered optical fiber bundle 14 form a generally planar focal plane for receiving an image thereon.

Figure 2C:
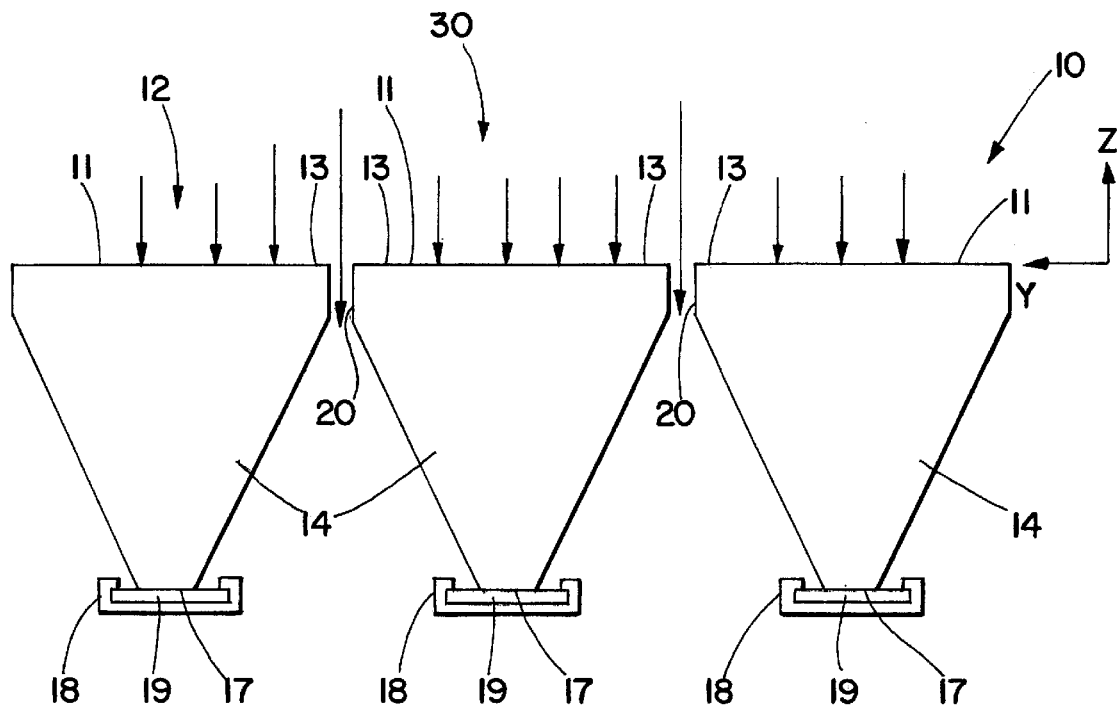
FIGS. 2A–2C illustrate the tapered optical fiber bundles of the conventional compound sensor array of FIG. 1 in greater detail.
Figure 2A:
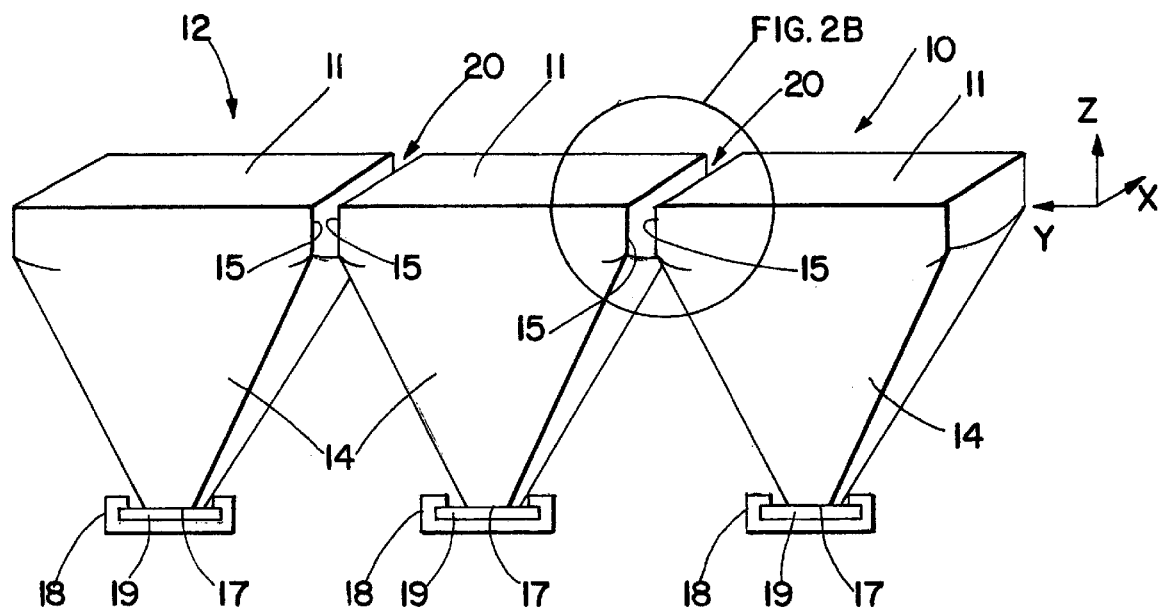

As illustrated in FIG. 2A, each CCD image sensor 18 includes a CCD chip 19 to which light is directed via each respective tapered optical fiber bundle 14. Light exits each optical fiber bundle 14 via an output face 17 opposite a respective input face. As is known to those with skill in the art, a CCD chip is a light-sensitive, solid state device composed of many small light-sensitive picture elements (pixels) arranged in an array. Light falling on a pixel is converted into a charge pulse which is then measured by electronics associated with the CCD chip and represented by a number. The number conventionally ranges from 0 (no light) to 65,536 (very intense light), although other ranges may be used. A digital image may be produced from the collection of light intensity numbers produced by a CCD chip. A data processor can store the image or can display the image by varying the light intensity for each pixel on a computer monitor in the proper order.

As is known to those skilled in the art, a CCD controller reads the image representation from the CCD chip, pixel by pixel, and organizes the image into a digital array. The digital array is then stored so as to be accessible to a data processor for performing various image processing techniques. Digital images can be stored on disk, transmitted over computer networks, and analyzed using various image processing techniques. It is to be understood that the present invention is not limited to CCD image sensors. Various other types of image sensors can be utilized without limitation.

Each tapered optical fiber bundle 14 is a collection of single optical fiber strands assembled together so that the relative orientation of the individual fibers is preferably maintained throughout the length of the bundle. The result is that a pattern of illumination incident at the input face 11 of the bundle 14 re-emerges from the output face 17 with the image preserved as precisely as possible. During the manufacturing process, however, some individual optical fibers may lose their orientation within a bundle, and/or become twisted. Accordingly, an image entering the input face 11 of a bundle 14 may not emerge from the output face 17 exactly the same. Furthermore, optical fibers along the outer edge portions of each bundle may be damaged during forming operations, thereby rendering these optical fibers optically inactive or may reduce the efficiency thereof. As illustrated in FIG. 1, each optical fiber bundle 14 has portions 15 that have been milled to provide the generally rectangular shape of each input face 11. These milled portions may contain optical fibers that are optically inactive or inefficient because of damage caused by milling (or other shaping) operations.

As is known to those skilled in the art, optical fiber bundles can be made in a variety of shapes and sizes. Magnification can be achieved by tapering the fibers in the bundle from the input face towards a respective output face. The input and output faces of an optical fiber bundle include the end faces of the optical fibers. Accordingly, a ray of light entering the input face of an optical fiber bundle propagates through an optical fiber and leaves through the output face. In order to successfully couple light from an optical fiber bundle to a CCD chip, the CCD chip and optical fiber bundle are conventionally in very close proximity.

As is known to those skilled in the art, bundles of optical fibers may be used to couple light from x-ray or neutron scintillator screens, chemiluminescent markers, image intensifiers, or streak tubes. When CCD image sensors are utilized in conjunction with X-rays and other sources of radiation, a luminescent film may overlie either the CCD chip or an optical fiber bundle to convert the incident radiation into a luminescent ray.

Figure 2B:
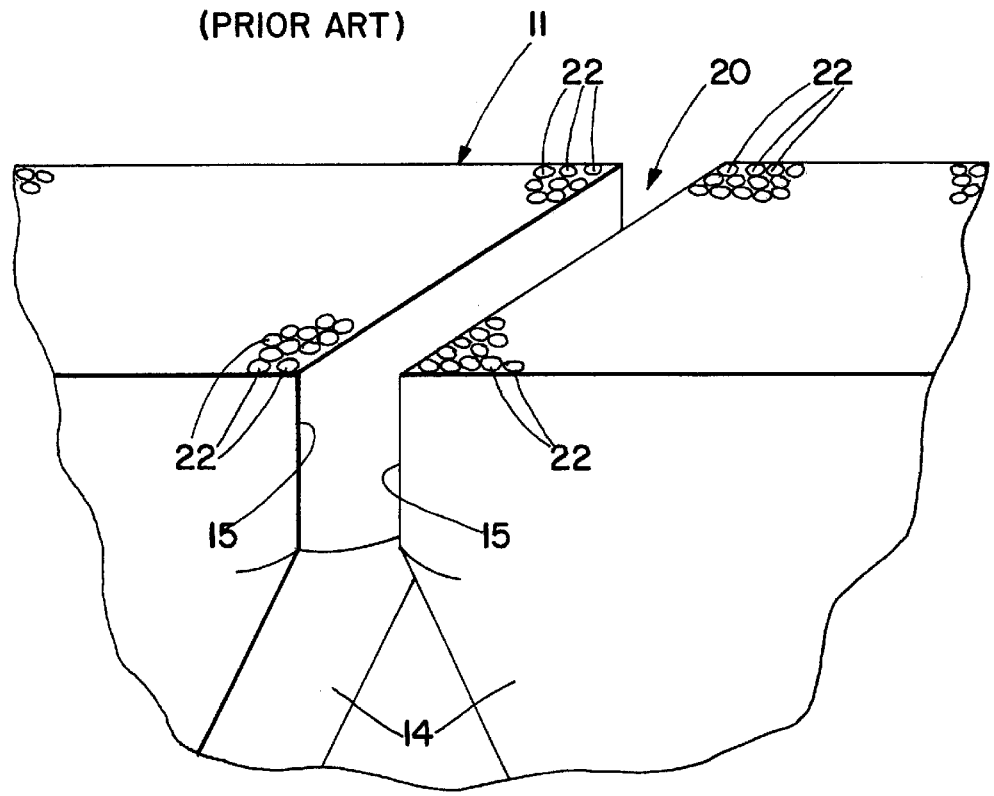

Referring now to FIGS. 2A–2B, the tapered optical fiber bundles 14 of the conventional compound sensor array 10 of FIG. 1 are illustrated in greater detail. Each optical fiber bundle 14 has portions 15 that have been molded or milled to provide the generally rectangular shape of each input face 11 so that adjacent optical fiber bundles can be arranged in close abutting arrangement. FIG. 2B is an enlarged view of adjacent optical fiber bundles 14 and illustrates the individual optical fibers 22 terminating at the input faces 11 of each optical fiber bundle.

Referring now to FIG. 2C, the tapered optical fiber bundles 14 of the conventional compound sensor array 10 of FIG. 1 are arranged such the input faces 11 lie in the same plane (i.e., z=0). Even though adjacent optical fiber bundles are mated as close together as possible, gaps 20 may exist between adjacent optical fiber bundles 14, as illustrated (i.e., along the y axis). A portion of the radiation (i.e., light) 30 emitted from a source passes through these gaps 20 and is not directed to a CCD image sensor 18. Furthermore, optical fibers 22 along the outer edge portion 13 of an input face 11 may be damaged such that radiation incident thereon is not transmitted to the CCD chip 19.

Figure 3A:
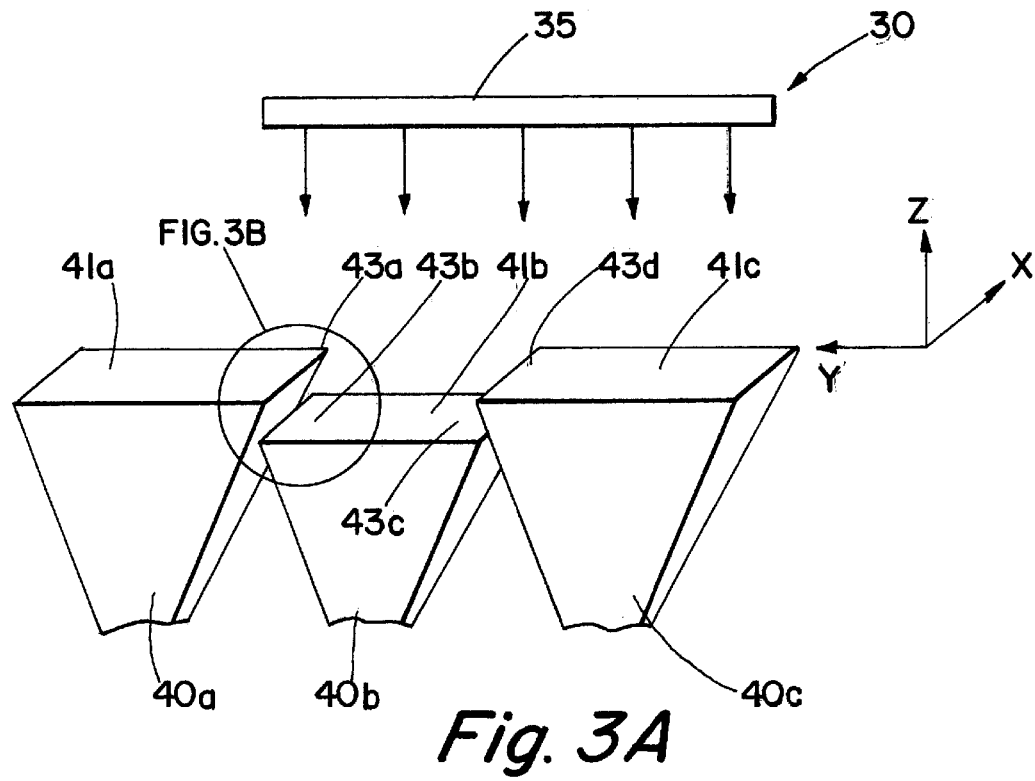
FIGS. 3A–3C illustrate an array of staggered optical fiber bundles in abutting relationship for directing radiation emitted from a source to an array of image sensors along a longitudinal direction (indicated by the z axis), according to the present invention.
Figure 3B:
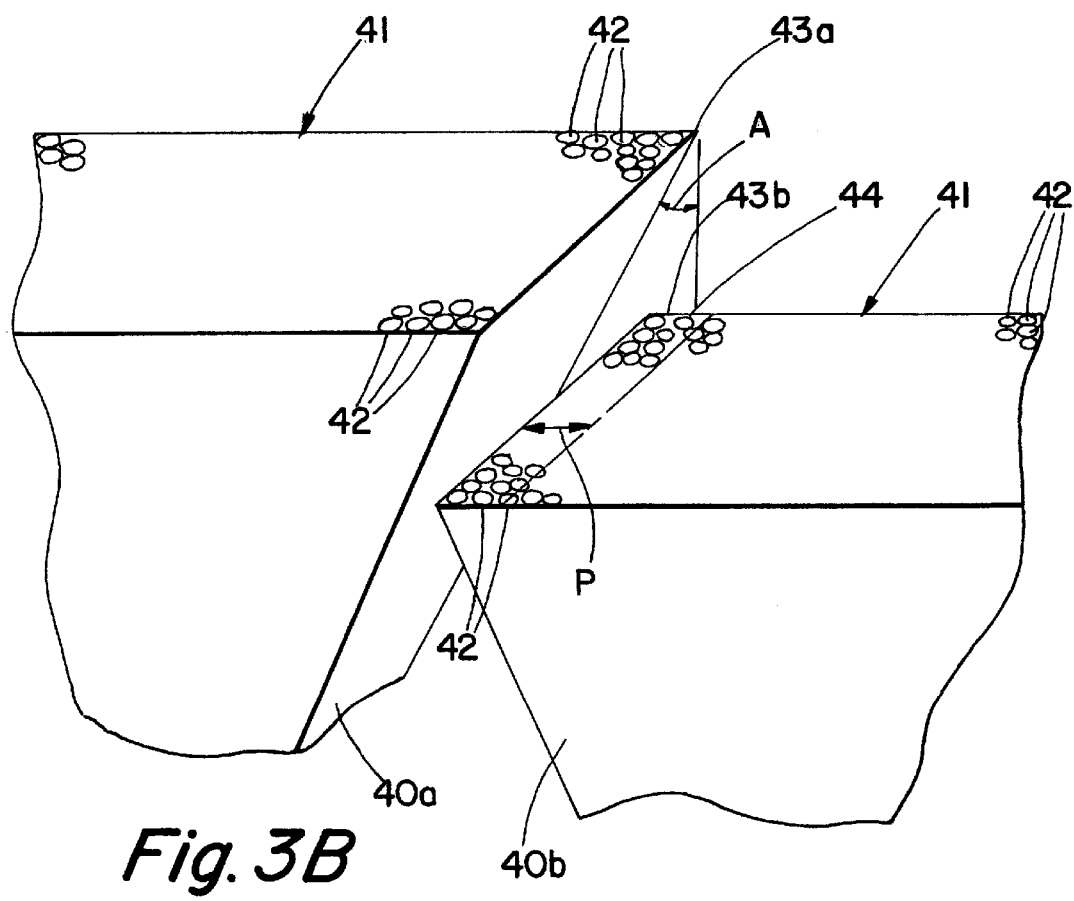
Figure 3C:
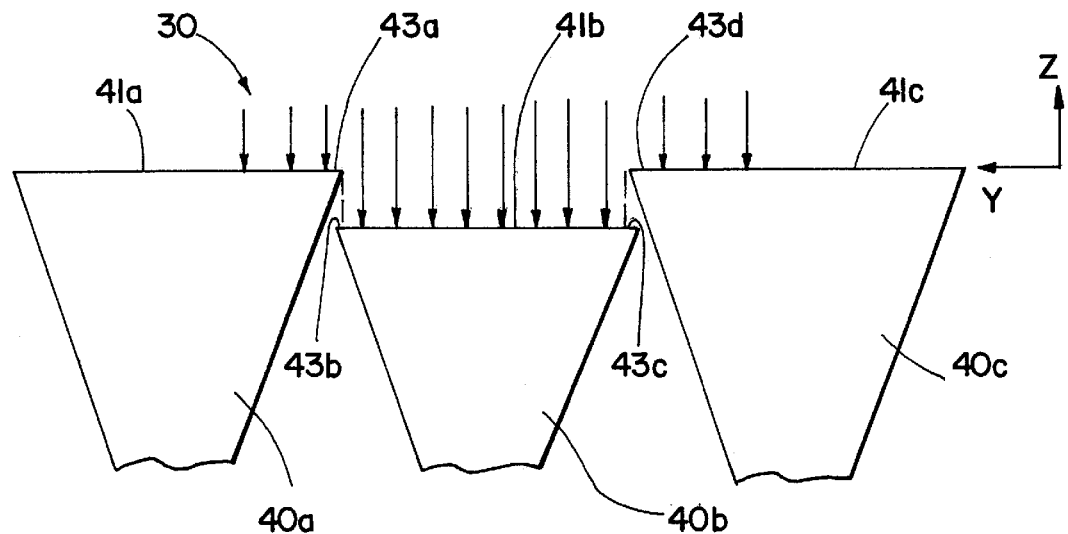

Referring now to FIGS. 3A–3C, an array of optical fiber bundles 40a, 40b, 40c in abutting relationship for directing radiation 30 emitted from a source 35 to an array of image sensors along a longitudinal direction (indicated by the z axis), according to an embodiment of the present invention is illustrated. Each optical fiber bundle 40a, 40b, 40c includes an input face (41a, 41b, 41c, respectively) substantially normal to the z axis and configured to receive incident radiation 30 from the source 35 thereon. Each optical fiber bundle 40a, 40b, 40c includes a decreasing cross-section along the z axis, as illustrated, and which terminates at an output face (not shown) opposite from the input face 41.

The input faces 41a, 41b, 41c of the respective tapered optical fiber bundles 40a, 40b, 40c are staggered with respect to one another along the z axis as illustrated. An input face edge portion 43a of the tapered optical fiber bundle 40a overlies an input face edge portion 43b so as to occlude the overlaid portion from incident radiation thereon. As illustrated in the enlarged view of FIG. 3B, the pixels in the shaded area 44 along the input face edge portion 43b of tapered optical fiber bundle 40b do not receive radiation incident thereon. As is known to those skilled in the art, the shaded area 44 may be calculated by multiplying the height of input face 41a relative to input face 41b by the tangent of the angle A of the taper of bundle 40a (i.e., Z tan (A)).

FIG. 3C illustrates incident radiation on the staggered tapered optical fiber bundles 40a, 40b, 40c of FIG. 3A in cross-section. Tapered optical fiber bundle 40b has input face edge portions 43b and 43c occluded by overlying input face edge portions 43a and 43d of tapered optical bundles 40a and 40c, respectively. The input faces 41a, 41b, 41c of the respective tapered optical fiber bundles 40a, 40b, 40c are staggered with respect to one another along the z axis between about 0.1 mm and 10.0 mm. For example, the input face 41a of the tapered optical bundle 40a may be positioned further along the z axis than the input face 41b of the tapered optical bundle 40b by between about 0.1 mm and 10.0 mm.

An arrangement of adjacent tapered optical fiber bundles in an overlapping configuration according to the present invention, can simplify the process for assembling arrays of optical fiber bundles. Precise abutting alignment of adjacent bundles may not be required to produce a seamless image. Furthermore, damaged optical fibers along the edge portions of a bundle can be occluded from receiving radiation thereon by an adjacent optical fiber bundle. As a result, higher resolution compound image sensors are possible via the present invention.

Figure 4:
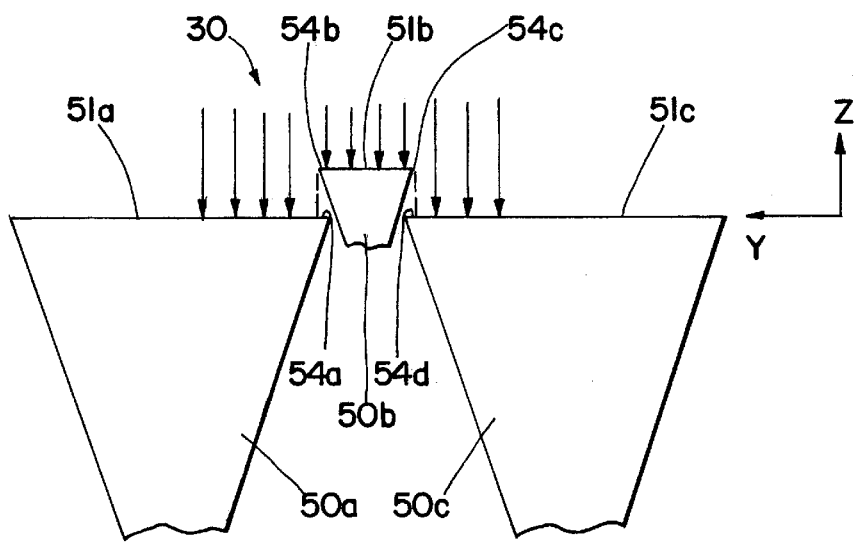
FIG. 4 illustrates a tapered optical fiber bundle positioned so as to lie above adjacent optical fiber bundles according to an embodiment of the present invention.

Tapered optical fiber bundle arrays according to the present invention can be produced in various configurations. As illustrated in FIG. 4, a tapered optical fiber bundle 50b is positioned along the z axis so as to lie above adjacent optical fiber bundles 50a and 50c. In the illustrated configuration input face edge portions 54b and 54c of tapered optical fiber bundle 50b overlie input face edge portions 54a and 54d of tapered optical fiber bundles 50a and 50c, respectively. As illustrated, edge portions 54b and 54c of tapered optical fiber bundle 50b occlude input face edge portions 54a and 54d of tapered optical fiber bundles 50a and 50c from receiving incident radiation 30 thereon. In the illustrated embodiment of FIG. 4, the tapered optical fiber bundle 50b is generally smaller than either of the adjacent tapered optical fiber bundles 50a and 50c. Accordingly, smaller optical fiber bundles can be utilized to eliminate gaps between larger optical fiber bundles in an array. However, tapered optical fiber bundles 50b may have virtually any size.

Figure 5:
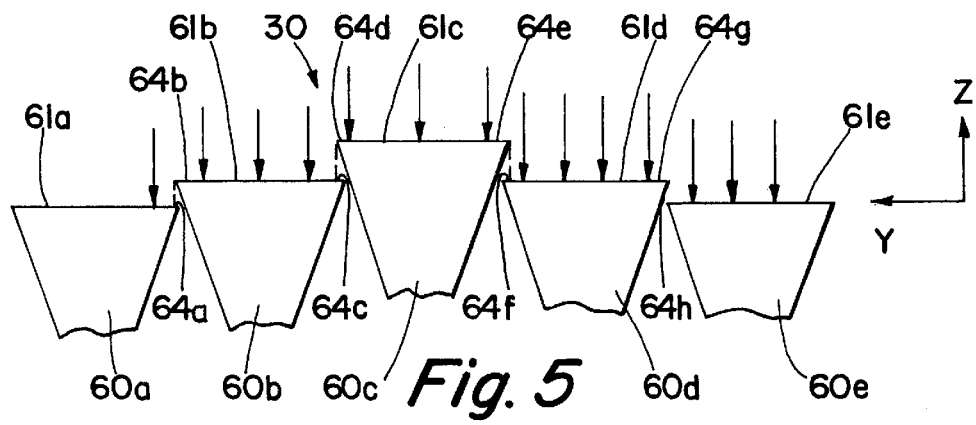
FIG. 5 illustrates a staggered, pyramid-like configuration of adjacent, abutting optical fiber bundles according to an embodiment of the present invention.

Referring now to FIG. 5, a staggered, pyramid-like configuration of adjacent, abutting optical fiber bundles (60a, 60b, 60c, 60d, 60e), according to another embodiment of the present invention, is illustrated. According to this aspect of the present invention, one or more optical fiber bundles in a medial portion of an array extend further along the z axis than adjacent tapered optical fiber bundles. As illustrated, a central tapered optical fiber bundle 60c overlies adjacent tapered optical fiber bundles 60b and 60d. Tapered optical fiber bundle 60b overlies adjacent optical fiber bundle 60a. Tapered optical fiber bundle 60d overlies adjacent optical fiber bundle 60e.

Figure 6A:
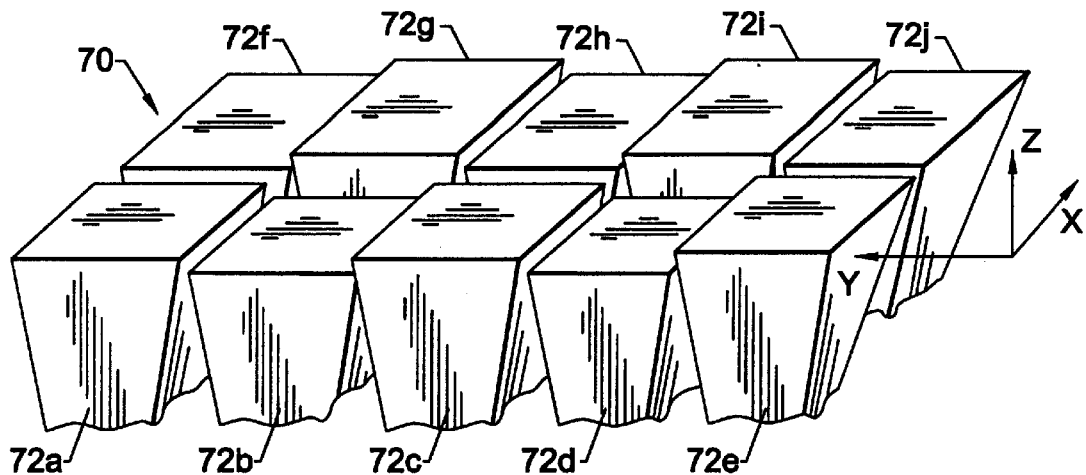
FIGS. 6A–6C illustrate a staggered array of tapered optical fiber bundles configured in a repeating pattern according to an embodiment of the present invention.
Figure 6B:
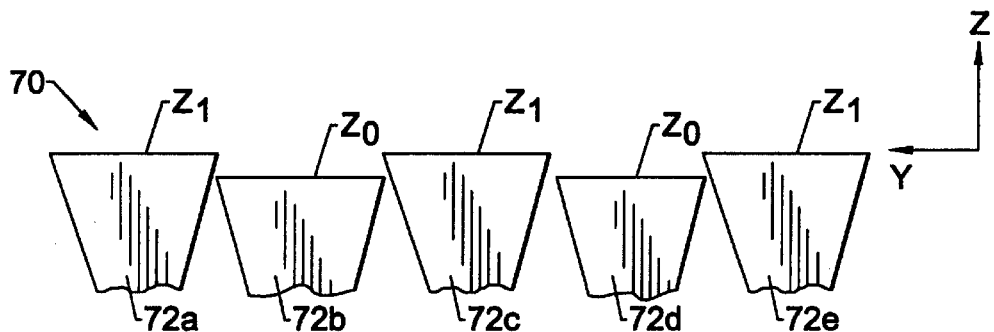
Figure 6C:
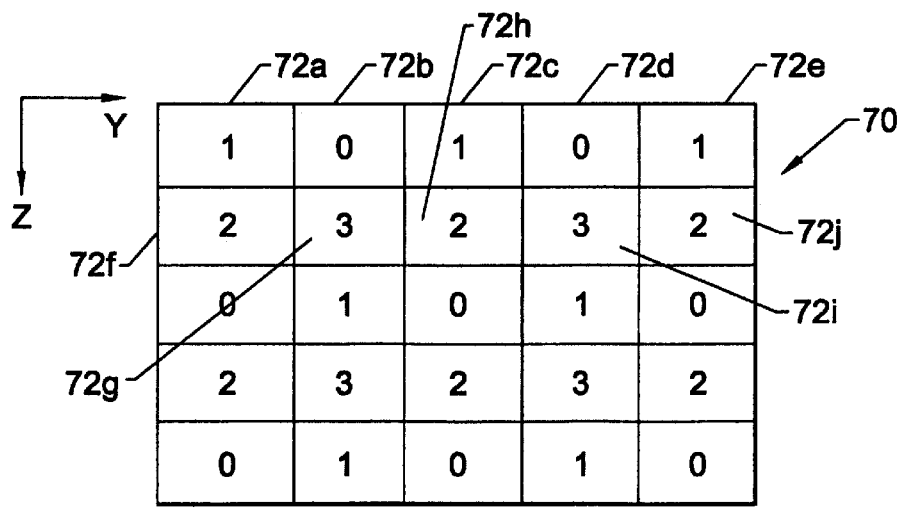

Tapered optical fiber bundles in an array can be staggered along the z axis in various patterns according to the present invention. The staggered patterns may be repeating or non-repeating. FIGS. 6A–6C illustrate a staggered array of tapered optical fiber bundles configured in an exemplary repeating pattern. FIG. 6A illustrates the first two rows of a five row array 70. FIG. 6B is a cross-sectional view of the first row of tapered optical fiber bundles (72a, 72b, 72c, 72d, 72e) in the array 70 illustrated in FIG. 6A.

FIG. 6C illustrates the position along the z axis for the input face of each tapered optical fiber bundle in the array. For example, the input face of tapered optical fiber bundle 72a is positioned along the z axis at z1 (z=1). The input face of tapered optical fiber bundle 72b is positioned along the z axis at z0 (z=0). Accordingly, the position of the input face of tapered optical fiber bundles 72a and 72b is illustrated in FIG. 6C as 1 and 0, respectively. Similarly, for the second row of the array, the input faces of tapered optical fiber bundles 72f, 72g, 72h, 72i, 72j have z axis positions of 2, 3, 2, 3, and 2, respectively. The tapered optical fiber bundles in the remaining rows of the array have a repeating configuration of the first two rows.

Figure 7A:
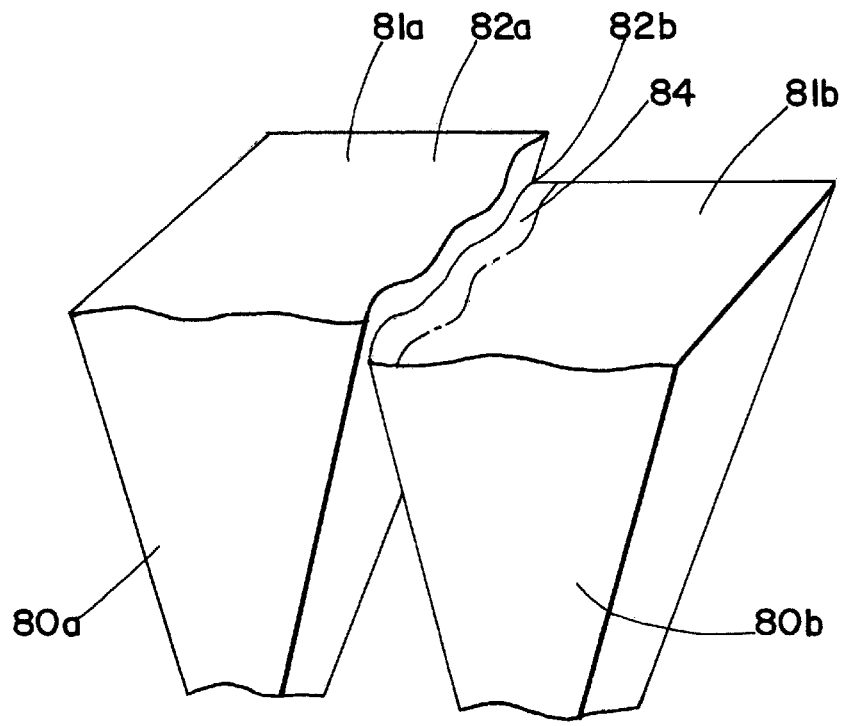
FIGS. 7A–7B illustrate tapered optical fiber bundles having input faces with irregular shaped edge portions configured into an array according to an embodiment of the present invention.
Figure 7B:
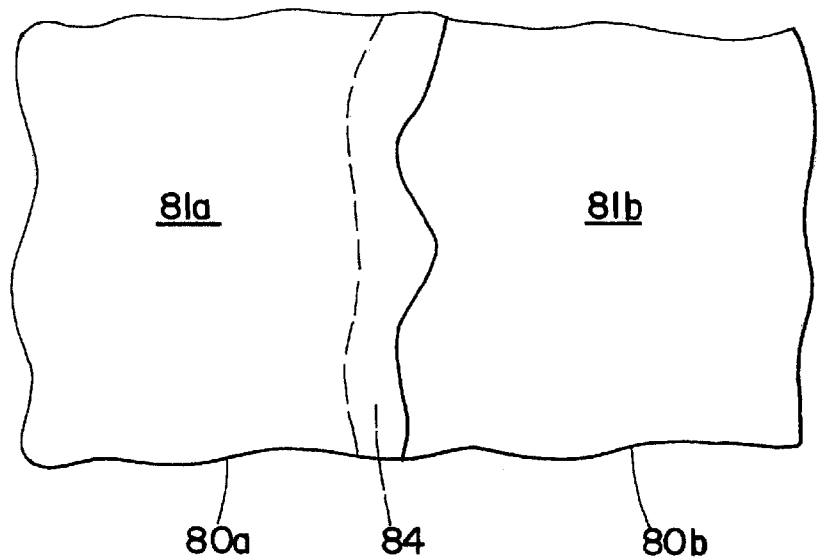

Referring now to FIGS. 7A–7B, tapered optical fiber bundles having input faces with irregular shaped edge portions may be configured into an array according to the present invention. In the illustrated embodiment, tapered optical fiber bundle 80a has an irregular shaped edge portion 81a. Tapered optical fiber bundle 80b also has an irregular shaped edge portion 82b. By staggering the input face 81a of tapered optical fiber bundle 80a with respect to adjacent tapered optical fiber bundle 80b, the two irregular shaped optical fiber bundles 80a and 80b can be arranged into a high resolution array. In the illustrated embodiment, the shaded region 84 is occluded from radiation by the overlying edge portion 82a.

Figure 8A:
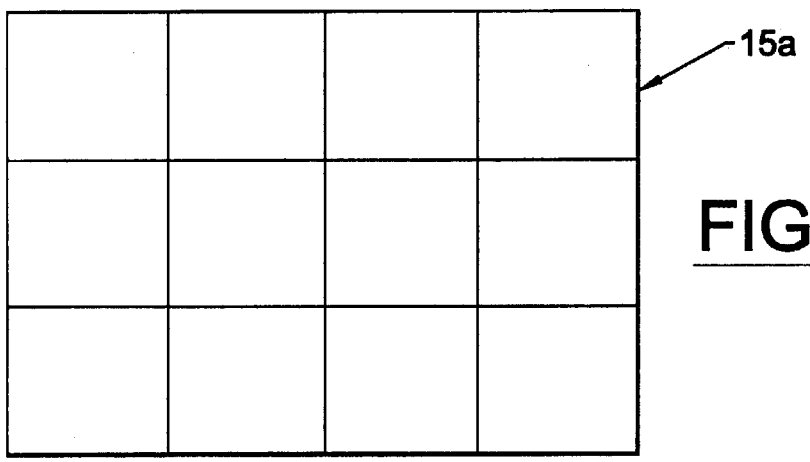
FIGS. 8A–8C illustrate various types of configurations of optical fiber bundle arrays.
Figure 8B:
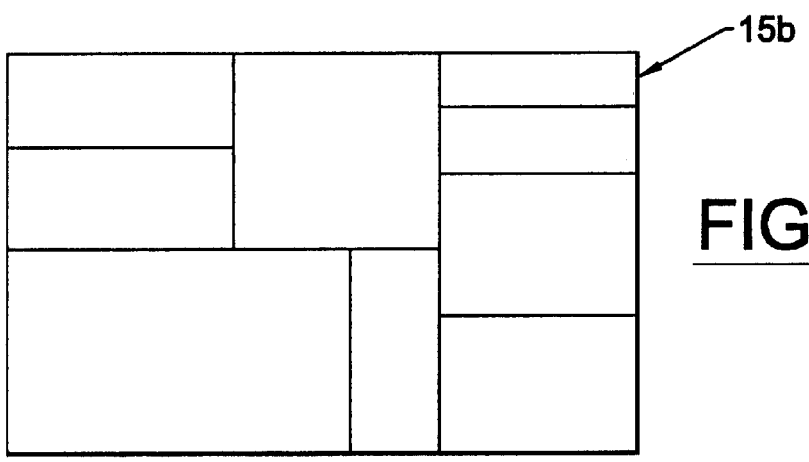
Figure 8C:
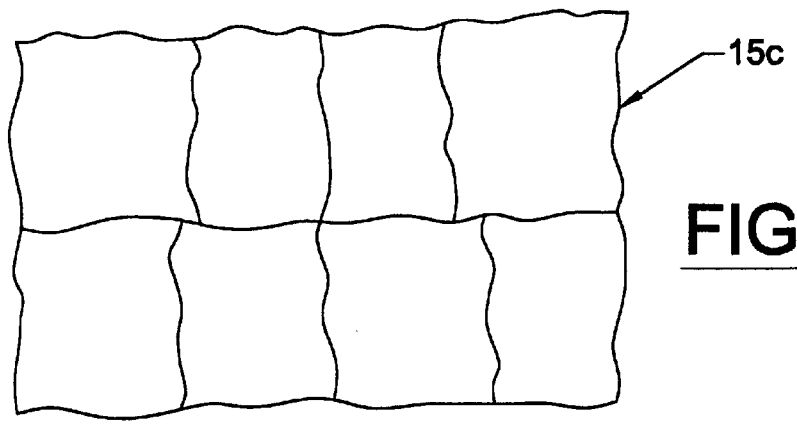

It is to be understood that in each of the illustrated embodiments disclosed herein, the numbers and configurations of optical fiber bundles in an array may vary, without departing from the spirit and intent of the present invention. For example, an array of optical fiber bundles according to the present invention may have a configuration similar to that illustrated in FIG. 8A wherein each bundle has a generally similar configuration. Alternatively, an array of optical fiber bundles according to the present invention may have a configuration similar to that illustrated in FIG. 8B wherein the bundles have a generally different size and configuration. Furthermore, an array of optical fiber bundles according to the present invention may have a configuration similar to that illustrated in FIG. 8C wherein the bundles have a generally irregular configuration.

Referring now to FIGS. 9A–9B, operations for a producing a compound sensor array according to the present invention are schematically illustrated. A plurality of optical fiber bundles are abutted to one another to form an array, such that input faces of the optical fiber bundles are staggered relative to one another (Block 100). Each optical fiber bundle in the array is then optically coupled to a respective image sensor (Block 200). The assembled compound image sensor array is then calibrated to correct for optical fibers that are damaged or otherwise dislocated within the bundles (Block 300). As illustrated in FIG. 9B, operations for calibrating a compound image sensor array (Block 300) include: scanning a ray of radiation across the input faces of each optical fiber bundle of the compound image sensor array (Block 310); and creating a pixel map comprising an address of each pixel indexed to a respective optical fiber (Block 320).

Referring to FIG. 9C, operations for constructing an image with a compound image sensor array (Block 400) include capturing an image with a compound image sensor array (Block 410) and applying a pixel map to the captured image to produce a correct image (Block 420). According to the present invention, a corrected image can be obtained by applying a pixel map created as described above to a stored image captured via a compound sensor array.

Figure 10A:
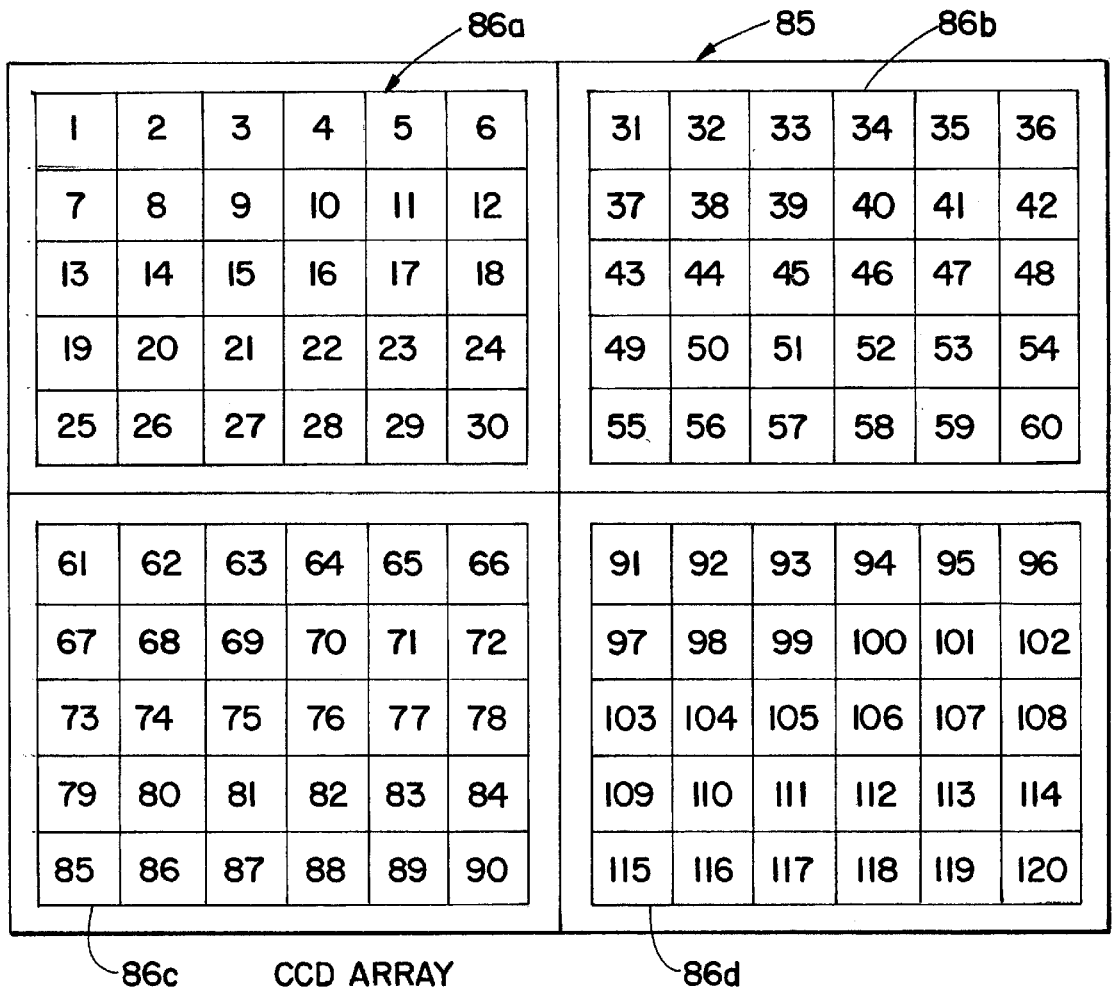
Figure 10B:
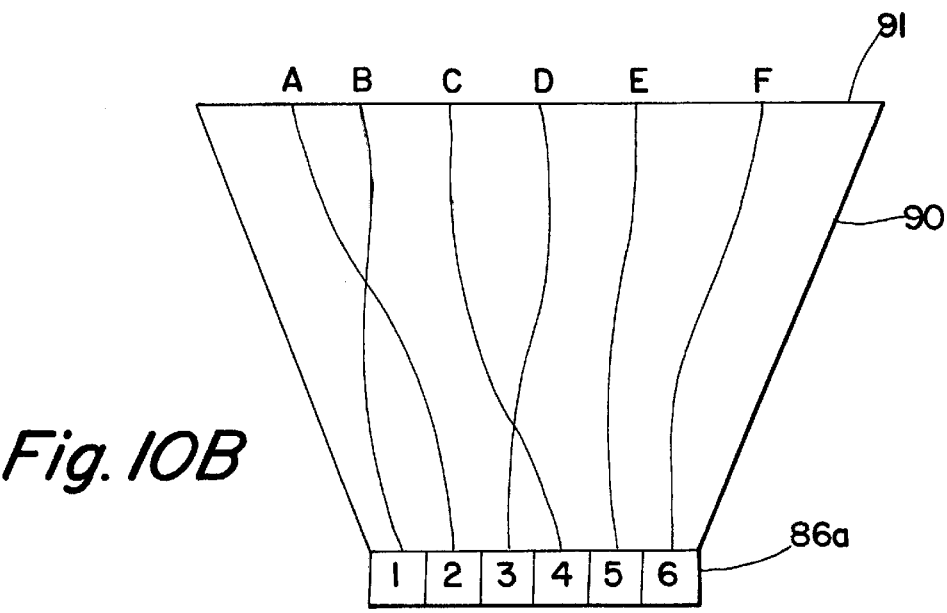

Operations for creating a pixel map are further illustrated in FIGS. 10A–10D. Referring initially to FIG. 10A, a simplified CCD image sensor array is illustrated. For illustrative purposes, the array includes four CCD chips 86a, 86b, 86c, 86d each having 6 by 5 arrays of pixels, numbered 1–30; 31–60; 61–90; and 91–120, respectively. Referring now to FIG. 10B a cross-sectional view of a portion of a tapered optical fiber bundle 90 configured to optically couple with the first row of pixels (pixels 1–6) of CCD chip 86a is schematically illustrated. Also illustrated are optical fibers (A, B, C, D, E, F) which, if correctly aligned, would be optically coupled to pixels 1, 2, 3, 4, 5, and 6, respectively. However, as illustrated, optical fibers A and B are twisted and are optically coupled with pixels 2 and 1, respectively. Similarly, optical fibers C and D are twisted and are optically coupled with pixels 4 and 3, respectively. A ray of light entering optical fiber A will be incident upon pixel 2, rather than pixel 1. Similarly, a ray of light entering optical fibers B, C, and D will be incident upon pixels 1, 4, and 3, rather than pixels 2, 3, and 4. Accordingly, an image transmitted from the input face 91 of the tapered optical fiber bundle 90 along the optical fibers A–F to the CCD chip will have portions thereof transposed.

To correct the problems caused by misaligned or damaged optical fibers within a bundle, a compound sensor array is calibrated by scanning a ray of light across the input faces of the array of optical fiber bundles and recording in a pixel map the address of each pixel activated by each respective optical fiber. FIG. 10C schematically illustrates a pixel map 95 for the compound sensor array of FIG. 10A. The actual address of each pixel in a CCD chip in the compound sensor array is identified at the upper left corner of each pixel. The perceived address of each pixel, based upon light impinging the input face of the optical fiber bundle is identified in the center. A pixel map may include a table, linked list shift register, memory array or any other techniques for storing an array.

Referring now to FIG. 10D, a stored image 97 captured by the compound image sensor array of FIG. 10A is schematically illustrated. Light (or radiation) intensity values are stored within each pixel as illustrated. A corrected image can be obtained by applying the pixel map 95 to the stored image. In the illustrated example, the stored light intensity values for pixels 1 and 2 would be transposed. Similarly, the stored light intensity values for pixels 3 and 4 would be transposed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A compound image sensor array, comprising:
   an array of image sensors;
   a plurality of tapered optical fiber bundles for directing radiation emitted from a source to said array of image sensors along a longitudinal direction;
   wherein each tapered optical fiber bundle comprises:
      an input face substantially normal to the longitudinal direction and configured to receive incident radiation from said source thereon; and
      a decreasing cross-section along said longitudinal direction terminating at an output face opposite from said input face, said output face optically coupled with a respective image sensor; and
   wherein input faces of at least two respective adjacent tapered optical fiber bundles are staggered with respect to one another along said longitudinal direction.

2. A compound image sensor array according to claim 1 wherein an input face edge portion of a tapered optical fiber bundle overlies a portion of an input face of an adjacent optical fiber bundle so as to occlude said overlaid portion from incident radiation.

3. A compound image sensor array according to claim 1 wherein said optical fiber bundles comprise optical fibers that are tapered such that a diameter of said optical fibers is less at the output face than at the input face of said bundles.

4. A compound image sensor array according to claim 1 further comprising a data processor electrically connected to each image sensor to process signal output from each of said image sensors.

5. A compound image sensor array according to claim 1 wherein each image sensor comprises a CCD chip that converts radiation incident thereon into electrical signals.

6. A compound image sensor array according to claim 1 wherein input faces of respective adjacent tapered optical fiber bundles are staggered with respect to one another along said longitudinal direction between about 0.1 mm and 10.0 mm.

7. A compound image sensor array according to claim 1 wherein input faces of respective adjacent tapered optical fiber bundles are staggered with respect to one another along said longitudinal direction in a repeating pattern.

8. A compound image sensor array according to claim 1 wherein an input face of at least one of said at least two respective adjacent tapered optical fiber bundles comprises an irregular shaped edge portion.

9. A compound image sensor array according to claim 2 wherein said input face edge portion overlying a portion of an input face of an adjacent optical fiber bundle comprises an irregular shape.

10. A compound image sensor array for producing a substantially seamless image, comprising:
    an array of image sensors;
    a plurality of tapered optical fiber bundles for directing radiation emitted from a source to said array of image sensors along a longitudinal direction;
    wherein each tapered optical fiber bundle comprises:
        an input face substantially normal to the longitudinal direction and configured to receive incident radiation from said source thereon; and
        a decreasing cross-section along said longitudinal direction terminating at an output face opposite from said input face, said output face optically coupled with a respective image sensor; and
    wherein an input face of at least one tapered optical fiber bundle along a medial portion of said compound image sensor array is positioned along said longitudinal direction such that input face edge portions thereof overlie portions of input faces of at least two adjacent optical fiber bundles so as to occlude each overlaid portion from incident radiation.

11. A compound image sensor array according to claim 10 wherein an input face of at least one tapered optical fiber bundle along a medial portion of said compound image sensor array is positioned closer to a radiation source than input faces of other respective optical fiber bundles.

12. A compound image sensor array according to claim 10 wherein said optical fiber bundles comprise optical fibers that are tapered such that a diameter of said optical fibers is less at the output face than at the input face of said bundles.

13. A compound image sensor array according to claim 10 further comprising a data processor electrically connected to each image sensor that processes signal output from each of said image sensors.

14. A compound image sensor array according to claim 10 wherein each image sensor comprises a CCD chip that converts radiation incident thereon into electrical signals.

15. An array of optical fiber bundles for directing radiation emitted from a source to an array of image sensors along a longitudinal direction, said array comprising:
    a plurality of tapered optical fiber bundles in abutting relationship, wherein each optical fiber bundle comprises:
        an input face substantially normal to the longitudinal direction and configured to receive incident radiation from said source thereon; and
        a decreasing cross-section along said longitudinal direction terminating at an output face opposite from said input face; and
    wherein input faces of at least two respective adjacent tapered optical fiber bundles are staggered with respect to one another along said longitudinal direction.

16. An array of optical fiber bundles according to claim 15 wherein an input face edge portion of a tapered optical fiber bundle overlies a portion of an input face of an adjacent optical fiber bundle so as to occlude said overlaid portion from incident radiation.

17. An array of optical fiber bundles according to claim 15 wherein said optical fiber bundles comprise optical fibers that are tapered such that a diameter of said optical fibers is less at the output face than at the input face of each of said bundles.

18. An array of optical fiber bundles according to claim 15 wherein input faces of respective adjacent tapered optical fiber bundles are staggered with respect to one another along said longitudinal direction between about 0.1 mm and 10.0 mm.

19. An array of optical fiber bundles according to claim 15 wherein input faces of respective adjacent tapered optical fiber bundles are staggered with respect to one another along said longitudinal direction in a repeating pattern.

20. An array of optical fiber bundles according to claim 15 wherein an input face of at least one of said at least two respective adjacent tapered optical fiber bundles comprises an irregular shaped edge portion.

21. A method of producing a compound image sensor array, said method comprising abutting a plurality of optical fiber bundles to one another to form an array, such that input faces of the optical fiber bundles are staggered relative to one another.

22. A method according to claim 21 further comprising optically coupling each optical fiber bundle in the array to a respective image sensor.

23. A method according to claim 22 further comprising calibrating the compound image sensor array.

24. A method according to claim 23 wherein said step of calibrating the compound image sensor array comprises:
    scanning radiation across the input faces of each optical fiber bundle of the compound image sensor array; and
    creating a pixel map comprising an address of each pixel indexed to a respective optical fiber.

25. A method according to claim 22 further comprising the step of electrically connecting a data processor to each image sensor for processing signal output from each of the image sensors.

26. A method according to claim 21 further comprising positioning at least one tapered optical fiber bundle such that an input face edge portion thereof overlies a portion of an input face of an adjacent optical fiber bundle so as to occlude the overlaid portion from incident radiation.

27. A method according to claim 21 wherein input faces of respective adjacent tapered optical fiber bundles are staggered with respect to one another along the longitudinal direction between about 0.1 mm and 10.0 mm.

28. A method according to claim 21 wherein input faces of respective adjacent tapered optical fiber bundles are staggered with respect to one another along the longitudinal direction in a repeating pattern.

29. An imaging system comprising:
    a radiation source;
    an array of image sensors;
    a plurality of tapered optical fiber bundles for directing radiation emitted from said radiation source to said array of image sensors along a longitudinal direction;

wherein each tapered optical fiber bundle comprises:
an input face substantially normal to the longitudinal direction and configured to receive incident radiation from said source thereon; and
a decreasing cross-section along said longitudinal direction terminating at an output face opposite from said input face, said output face optically coupled with a respective image sensor;
wherein input faces of at least two respective adjacent tapered optical fiber bundles are staggered with respect to one another along said longitudinal direction; and
a data processor electrically connected to each image sensor that processes signal output from each of said image sensors.

30. An imaging system according to claim 29 further comprising means for calibrating said compound image sensor array.

31. An imaging system according to claim 30 wherein said means for calibrating the compound image sensor array comprises a pixel map comprising an address of each pixel indexed to a respective optical fiber.

32. An imaging system according to claim 29 wherein each image sensor comprises a CCD chip that converts radiation incident thereon into electrical signals.

33. An imaging system according to claim 29 wherein input faces of at least two respective adjacent tapered optical fiber bundles are staggered with respect to one another along said longitudinal direction between about 0.1 mm and 10.0 mm.

34. An imaging system according to claim 29 wherein input faces of respective adjacent tapered optical fiber bundles are staggered with respect to one another along said longitudinal direction in a repeating pattern.

35. An imaging system according to claim 29 wherein an input face edge portion of a tapered optical fiber bundle overlies a portion of an input face of an adjacent optical fiber bundle so as to occlude said overlaid portion from incident radiation.

36. An imaging system according to claim 29 wherein said optical fiber bundles comprise optical fibers that are tapered such that a diameter of said optical fibers is less at the output face than at the input face of said bundles.

37. An imaging system according to claim 29 wherein an input face of at least one of said at least two respective adjacent tapered optical fiber bundles comprises an irregular shaped edge portion.

* * * * *